United States Patent
Pilney et al.

(10) Patent No.: US 10,687,523 B2
(45) Date of Patent: Jun. 23, 2020

(54) BREAKAWAY BOOM SEGMENT WITH PERFORATED OUTER WALLS

(71) Applicant: CNH Industrial America LLC, New Holland, PA (US)

(72) Inventors: Brian J. Pilney, West Bend, WI (US); Brian A. Schad, Elkhart Lake, WI (US)

(73) Assignee: CNH Industrial America LLC, New Holland, PA (US)

( * ) Notice: Subject to any disclaimer, the term of this patent is extended or adjusted under 35 U.S.C. 154(b) by 49 days.

(21) Appl. No.: 15/131,402

(22) Filed: Apr. 18, 2016

(65) Prior Publication Data

US 2016/0316738 A1    Nov. 3, 2016

Related U.S. Application Data

(60) Provisional application No. 62/154,815, filed on Apr. 30, 2015.

(51) Int. Cl.
*A01M 7/00* (2006.01)
*A01C 23/00* (2006.01)

(52) U.S. Cl.
CPC ......... *A01M 7/0078* (2013.01); *A01C 23/008* (2013.01); *A01M 7/006* (2013.01); *A01M 7/0071* (2013.01)

(58) Field of Classification Search
CPC .. A01M 7/0078; A01M 7/006; A01M 7/0071; A01M 7/0075; A01M 7/0014; A01C 23/008; Y10T 29/29625
USPC ....................................................... 239/159
See application file for complete search history.

(56) References Cited

U.S. PATENT DOCUMENTS

| | | | |
|---|---|---|---|
| 1,656,810 A * | 1/1928 | Arnstein | B64C 1/065 52/634 |
| 3,565,340 A | 2/1971 | Meinert et al. | |
| 4,588,128 A | 5/1986 | Broyhill et al. | |
| 4,646,971 A | 3/1987 | Rogers | |
| 4,880,160 A | 11/1989 | Patterson et al. | |
| 4,962,892 A | 10/1990 | Sauer | |
| 5,156,338 A | 10/1992 | Borland et al. | |
| 5,348,226 A | 9/1994 | Heiniger et al. | |
| 5,992,759 A | 11/1999 | Patterson | |
| 6,053,419 A | 4/2000 | Krohn et al. | |
| 6,622,935 B1 | 9/2003 | Owens et al. | |
| 6,719,213 B1 | 4/2004 | Ferguson | |
| 6,837,446 B1 * | 1/2005 | Jesse | A01C 23/008 239/159 |
| 6,966,501 B2 * | 11/2005 | Wubben | A01M 7/0071 239/168 |
| 7,073,735 B2 | 7/2006 | Wubben et al. | |
| 7,150,419 B1 | 12/2006 | Tornionovic et al. | |

(Continued)

*Primary Examiner* — Darren W Gorman
*Assistant Examiner* — Christopher R Dandridge
(74) *Attorney, Agent, or Firm* — Rebecca L. Henkel; Rickard K. DeMille

(57) ABSTRACT

A breakaway boom segment is provided with perforated outer walls. The breakaway boom segment ma have a fabricated box configuration with cutouts, which may include a pair of multi-flanged channel pieces that are connected to each other with respective channel openings facing each other and pairs of upper and lower flanges connected to each other to provide a box configuration and having an interior space that is accessible through openings of the cutouts.

3 Claims, 9 Drawing Sheets

(56) References Cited

U.S. PATENT DOCUMENTS

| | | |
|---|---|---|
| 8,646,702 B2 | 2/2014 | Barker |
| 8,746,589 B2 | 6/2014 | Barker et al. |
| 9,258,989 B2 | 2/2016 | Barker et al. |
| 2003/0184075 A1* | 10/2003 | Freeman ................ B62D 21/00 280/797 |
| 2006/0201075 A1 | 9/2006 | Rivas |

* cited by examiner

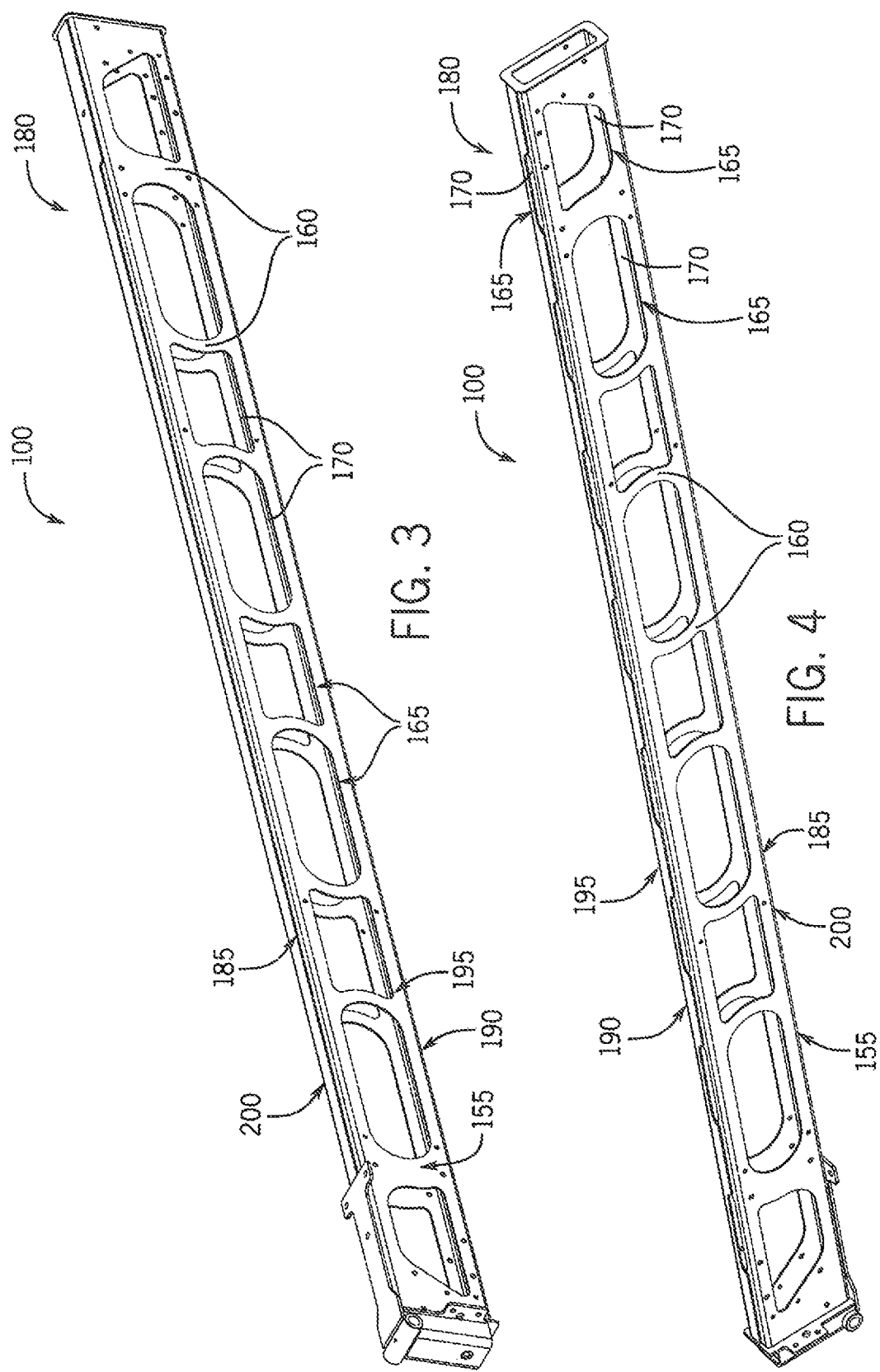

BREAKAWAY BOOM SEGMENT WITH PERFORATED OUTER WALLS

CROSS-REFERENCE TO RELATED APPLICATION

The present application claims the benefit of U.S. Ser. No. 62/154,815 filed Apr. 30, 2015.

FIELD OF THE INVENTION

The invention relates generally to agricultural product application equipment such as self-propelled sprayers and, in particular, to a sprayer boom with perforated outer walls including a breakaway boom segment with perforated outer walls, which may include a fabricated box breakaway boom segment with cutouts.

BACKGROUND OF THE INVENTION

Sprayer boom widths are increasing over time to allow increased coverage in a single spraying pass. The longer booms have breakaway segments that are spaced far from the boom support at the sprayer vehicle. Solid wall breakaway boom segments can be relatively heavy and can apply relatively large forces to the sprayer vehicle while the boom dynamically flexes during use because the breakaway boom segments are cantilevered far away from the sprayer vehicle. Trellis-style breakaway boom segments can be lighter than solid wall breakaway boom segments but have stress points at intersections between flame tube stringers and angularly arranged tubular brace segments. Typical trellis-style breakaway boom segments are made from tubes with a lot of piece parts. Accordingly, trellis-style breakaway boom segments can require a lot of labor to fabricate because the numerous individual piece parts or components, such as those used as the frame tube stringers and angularly arranged tubular brace segments, require fit-up and welding or bolting.

SUMMARY OF THE INVENTION

A breakaway boom segment of a sprayer boom for an agricultural sprayer is provided that is lightweight durable, and is uncomplicated to assemble.

According to one aspect of the invention, the breakaway boom segment has perforated outer walls. The breakaway boom segment may have a fabricated box configuration with cutouts. This provides breakaway boom segments that minimize the number of parts required, reducing fabrication time compared with trellis-style breakaway boom segments, and reduces weight of the breakaway boom segments compared with solid wall constructions. The fabricated box configuration with cutouts spreads out forces through large surface areas of the box construction and provides obstruction-free interiors of the breakaway boom segments that are accessible through the cutouts.

According to another aspect of the invention, the breakaway boom segment may be fabricated from two multi-flanged channel pieces connected to form a box. The channel pieces face each other like mirror images with nested upper and lower flanges defining multi-layer or overlapping wall segments that are connected to form the box. Each channel piece may have cutouts to define openings through front and rear walls of the box and with slots through a lower wall of the box. When making, each channel piece may start as a flat piece of sheet material that is formed into a blank or pattern with cutouts that is then bent to arrive at the respective channel configuration. The channel pieces are arranged with their channel openings facing toward each other. Respective paired upper and lower walls of the channel pieces are stacked on each other, providing nested upper and lower walls with overlapping portions. This defines lap joints that are welded to form the upper and lower walls of the box of the breakaway boom segment.

When assembled, the front and rear walls of the box of the breakaway boom segment may be substantially open. The front and rear walls may be defined by vertically-arranged solid flange segments at upper and lower ends of the box that are connected to each other by web segments with curved profiles that define outer boundaries of the respective portions of the cutouts. The curved web segments at the front and rear walls may gradually transition into the upper and lower flange segments. In this way, the web segments spread out the forces experienced by the breakaway boom segment across relatively large areas instead of concentrating the forces at points of intersections between the tubular segments and angularly arranged brace segments. The cutouts of the front and rear walls of the box provide access into the interior space of the breakaway boom segment, allowing for servicing of plumbing or other components that may be routed or housed inside the interior space of the breakaway boom segment. The cutouts of the front and rear walls of the box also reduce the weight of the assembled breakaway boom segment.

According to another aspect of the invention, the breakaway boom segment includes upper and lower walls extending longitudinally with respect to the remainder of the boom that supports the breakaway boom segment. A front wall faces a forward travel direction of a sprayer carrying the boom incorporating the breakaway boom segment. The front wall includes upper and lower portions respectively connected to the upper and lower walls and having multiple cutouts defining front wall openings. A rear wall is spaced from the front wall and faces a reverse travel direction of the sprayer carrying the boom incorporating the breakaway boom segment. The rear wall includes upper and lower portions respectively connected to the upper and lower walls and has multiple cutouts defining rear wall openings. The front and rear wall openings may occupy a majority of the surface areas of the front and rear walls permitting access into an interior space of the breakaway boom segment defined inwardly of the upper, lower, front, and rear walls.

According to another aspect of the invention, each of the front and rear walls defines a perforated surface with webs of material extending between front and rear wall openings. The webs of material may define web segments with curved profiles that define portions of outer boundaries of the respective cutouts. Each web segment may have a convex portion and a concave portion facing in opposite directions.

According to another aspect of the invention, a first set of cutouts may be defined between respective adjacent concave portions facing each other of adjacent pairs of web segments and wherein cutouts of the first set of cutouts define generally oval perimeter shapes. The cutouts may define generally or for the most part, flat top and bottom segments. A second set of cutouts may be defined between respective adjacent convex portions facing each other of adjacent pairs of web segments and wherein cutouts of the second set of cutouts define generally hourglass perimeter shapes.

According to another aspect of the invention, the upper, lower, front, and rear walls may be defined by a pair of multi-flanged channel pieces that are connected to each other forming a box configuration of the breakaway boom segment.

According to another aspect invention, a method is provided for making a breakaway boom segment for use with a sprayer boom of an agricultural sprayer. The method includes forming a blank from a flat piece of sheet material. The blank may be made by cutting along a path including an outer perimeter path providing an outer perimeter shape of the blank and cutting along multiple cutout paths providing a cutout perimeter shape corresponding to openings extending through the blank. A multi-flanged channel piece may be formed by bending outer side portions of the blank in a common direction relative to an intermediate portion of the blank. The openings of the blank may be arranged such that the multi-flanged channel piece may be defined by a perforated side wall formed from the intermediate portion of the blank, with a pair of flanges formed of the bent outer side portions of the blank. The pair of flanges may be spaced from each other and extend perpendicularly from the perforated side wall in a common direction with a channel opening defined, between the pair of flanges. A box from the multi-flanged channel piece may be formed by at least partially closing the channel opening of the multi-flanged channel piece so that the side wall of the multi-flanged channel piece defines a perforated outer wall of the box.

According to another aspect of the invention, the multi-flanged channel piece is a first multi-flanged channel piece. A second multi-flanged channel piece may be formed that has a side wall and a pair of flanges spaced from each other and extending perpendicularly from the side wall in a common direction with a channel opening defined between the pair of flanges. Forming the box may include connecting the first and second multi-flanged channel pieces to each other with the respective channel openings facing each other. Openings extending through the side wall of the second multi-flanged channel piece define a perforated side wall of the second multi-flanged channel piece. The first and second multi-flanged channel pieces may be arranged with respect to each other so that the perforated side walls of the first and second multi-flanged channel pieces define front and rear walls of the box with the openings permitting access into an interior space of the box. Lower flanges of each of the first and second multi-flanged channel pieces may include an elongate recess. The elongate recesses of the lower flanges of the first and second multi-flanged channel pieces may be arranged adjacent each other to define slots through a lower wall of the box. The upper and lower flanges of the first and second multi-flanged channel pieces may be nested to provide overlapping wall segments at upper and lower walls of the box.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation, Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 3 is a pictorial view from above of a breakaway boom segment according to the present invention;

FIG. 4 is a pictorial view from below of the breakaway boom segment of FIG. 3;

DETAILED DESCRIPTION OF THE PREFERRED EMBODIMENTS

Figure 1:
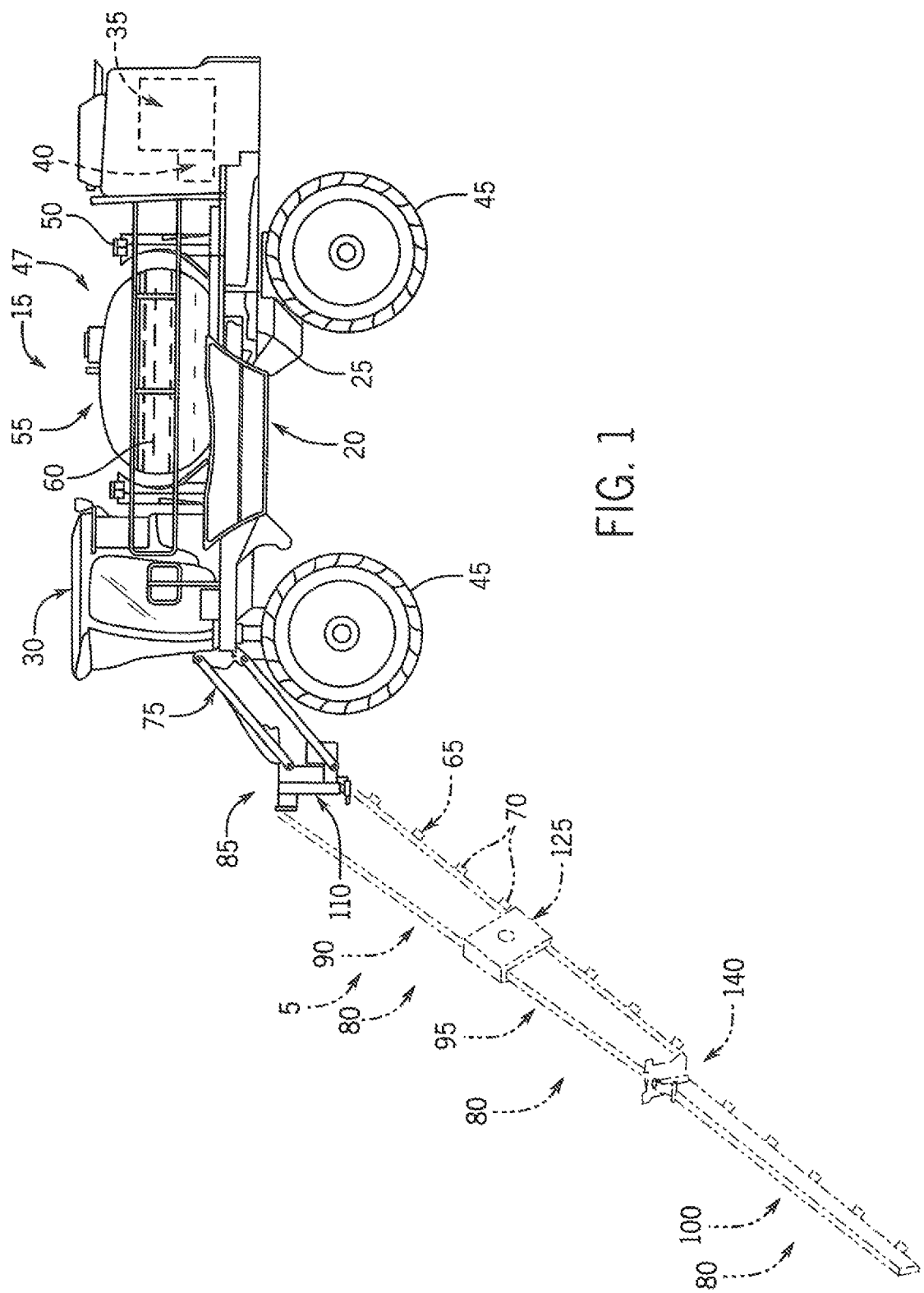
FIG. 1 is a side elevation of a self-propelled sprayer with a breakaway boom segment according to the present invention.

Referring now to the drawings and specifically to FIG. 1, a sprayer boom 5 with perforated outer walls, including breakaway boom segments 100 at outer ends of boom 5 with perforated outer walls as explained in greater detail elsewhere herein, is shown for use with an agricultural sprayer. The agricultural sprayer is shown here as a self-propelled agricultural sprayer vehicle or self-propelled sprayer 15. Although sprayer 15 is shown as a front-mounted boom self-propelled sprayer, it is understood that self-propelled versions of sprayer 15 can have either front-mounted or rear-mounted booms, such as those available from CNH Industrial, including the Miller Nitro and Condor Series sprayers and New Holland Guardian Series sprayers.

Still referring to FIG. 1, sprayer 15 includes chassis 20 having chassis frame 25 that supports various assemblies, systems, and components. These various assemblies, systems, and components include cab 30, engine 35, and hydraulic system 40. Hydraulic system 40 receives power from engine 35 and includes at least one hydraulic pump which may be in a hydrostat arrangement for providing hydraulic pressure for operating hydraulic components within the hydraulic system 40. For sprayers with hydrostatic drives, hydraulic motors are operably connected to the hydraulic pump(s) for rotating wheels 45. In mechanical drive applications, a mechanical transmission receives power from engine 35 and delivers power for rotating wheels 45 by way of power-transmitting driveline components such as drive shafts, differentials, and other gear sets in portal, drop boxes, or other housings. Spray system 47 includes storage containers such as rinse tank 50 storing water or a rinsing solution and product tank 55 that stores a volume of product 60 for delivery onto an agricultural field with sprayer 15. A product delivery pump conveys product 60 from product tank 55 through plumbing components such as interconnected pieces of tubing and through a boom tubing system 65 for release out of sprayer nozzles 70 that are spaced from each another along the width of boom 5 during spraying operations of sprayer 15. Boom 5 is connected to chassis 20 with lift arm assembly 75 that is configured to move the boom 5 up and down for adjusting the height of application of the product 60.

Figure 2:
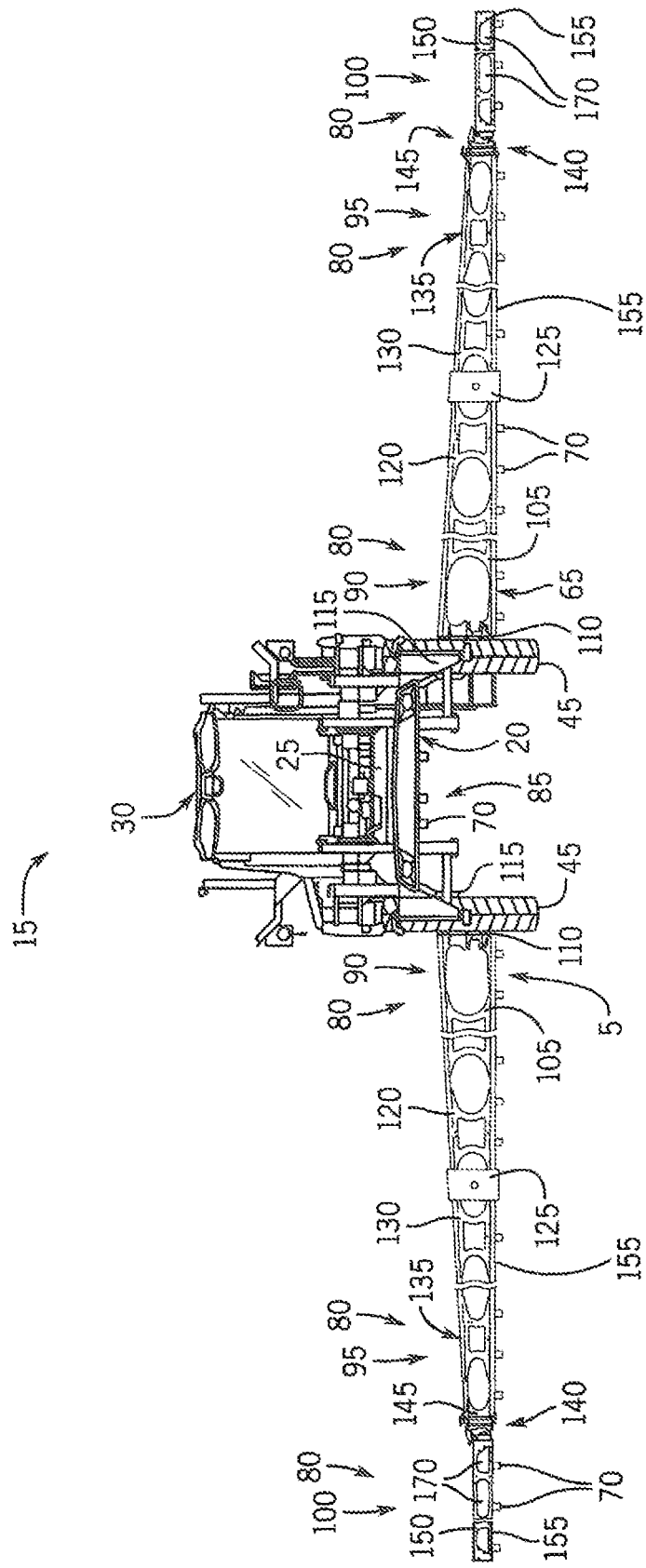
FIG. 2 is a front elevation of a self-propelled sprayer with a sprayer boom according to the present invention.

Referring now to FIG. 2, boom 5 includes a center section and left and right boom arms collectively defined by multiple boom segments 80 connected longitudinally to provide the corresponding width of the assembled boom 5. Boom segments 80 include center section 85 and pairs of primary boom segments 90, secondary boom segments 95, and breakaway boom segments 100 extending in opposite directions mirrored about a longitudinal axis of the sprayer 15 along the left and right boom arms. The corresponding left and right segments of the pairs of primary, secondary, and breakaway boom segments 90, 95, 100 of the left and right boom arms are substantially identical, so only one will be described, with the description applying to both the left and right segments. Primary boom segment 90 has a primary boom inner end 105 that is connected with hinge 110 to center section outer end 115, with hinge 110 configured to allow for generally rearward horizontal pivoting of the boom primary, secondary, and breakaway segments 90, 95, 100 toward the chassis 20 when folding boom 5 to achieve a stored position. Primary boom segment 90 extends from primary boom inner end 105 away from center section 85 to primary boom outer end 120. Hinge 125 is arranged between primary boom outer end 120 and secondary boom inner end 130 and is configured to allow for folding the secondary and breakaway segments 95, 100 relative to primary boom segment 90 to achieve the stored position. For horizontal folding of secondary and breakaway segments 95, 100 against the primary boom segment 90, the hinge 125 allows a horizontal pivoting of the secondary and breakaway segments 95, 100 toward primary boom segment 90. For vertical folding of secondary and breakaway segments 95, 100 against the primary boom segment 90, the hinge 125 allows vertical pivoting of the secondary and breakaway segments 95, 100 toward to primary boom segment 90. Secondary boom segment 95 extends from secondary boom inner end 130 away from primary boom segment 90 to secondary boom outer end 135. Breakaway joint 140 is arranged between secondary boom outer end 135 and breakaway boom inner end 145 and is configured to allow for momentary deflecting of the breakaway boom segment 100 away from its outwardly extended neutral position during touchdown events such as collisions with the crops, the ground, and/or other obstacles. Breakaway boom segment 100 extends from breakaway boom inner end 145 away from secondary boom segment 95 to breakaway boom outer end 150. In the stored position of boom 5, the secondary and breakaway boom segments 95, 100 are folded against the primary boom segment 90. The primary boom segment 90 is folded toward chassis 20 so that the breakaway boom outer end 150 is near the primary boom inner end 105 tucked toward the front of sprayer 15 with the primary boom outer end 120 and secondary boom inner end 130 tucked toward the back of sprayer 15.

Figure 5:
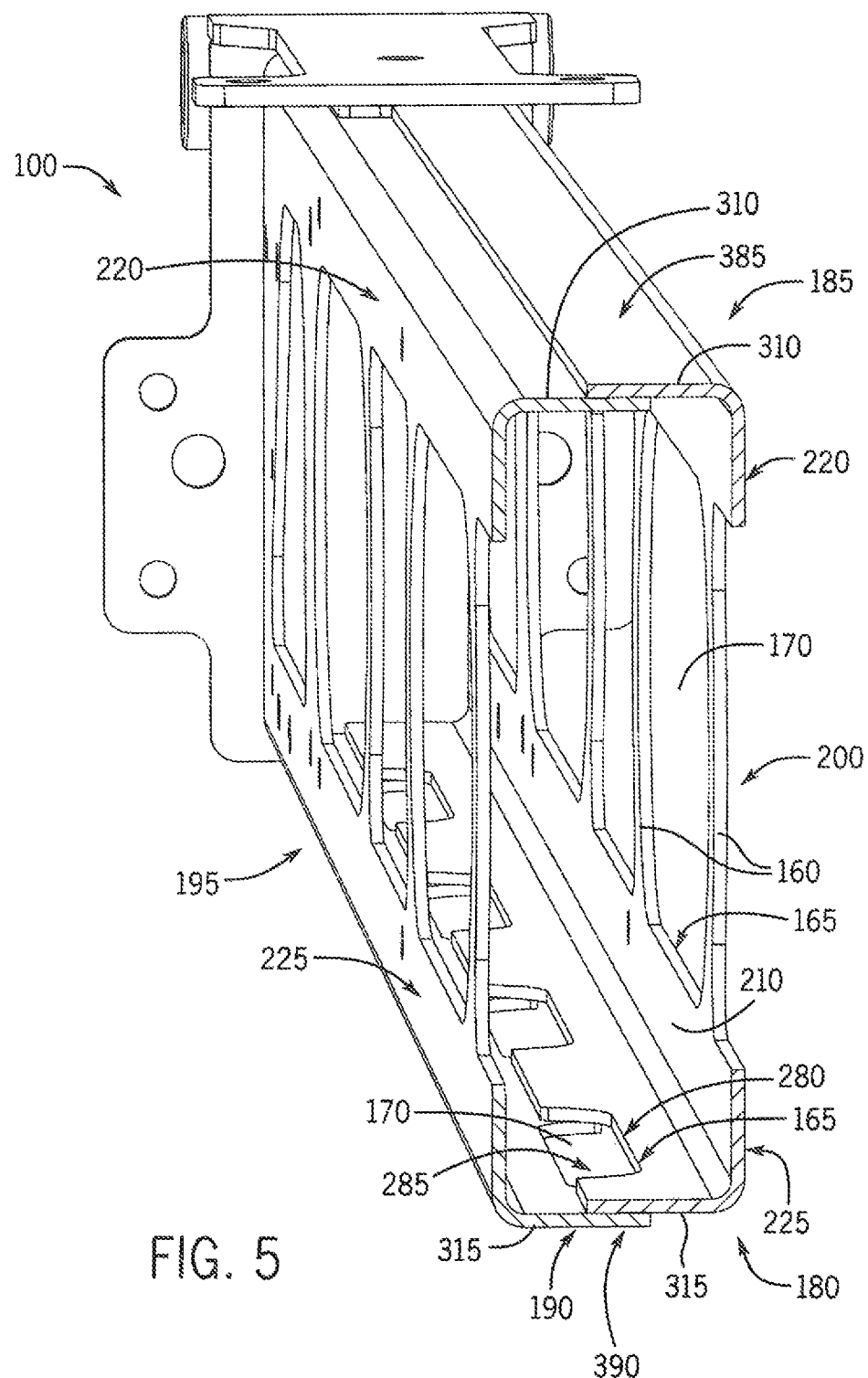
FIG. 5 is a cross-sectional view of the breakaway boom segment of FIG. 3.

Referring now to FIGS. 3-4, each boom segment 80 is shown with perforated outer walls 155 defining corresponding perforated surfaces as webs of material 160 separated by cutouts 165 defining openings 170 that collectively provide the perforated configuration of the outer walls 155. Referring now to FIG. 5, the perforated outer walls 155 of breakaway boom segment(s) 100 are provided at a body of the breakaway boom segment 100. Referring now to FIG. 5, the body of breakaway boom segment 100 has a box configuration shown as box 180 which may have a rectangular cross-sectional perimeter shape with upper, lower, front, and rear walls 185, 190, 195, 200 that collectively extend about an interior space 210 of boom segment 100. Openings 170 may occupy a majority or greater than at least about fifty-percent of the surface areas of portions of the breakaway boom segment 100 such as front and rear walls 195, 200, permitting access into interior space 210 of breakaway boom segment 100 (FIGS. 3-4). The openings 170 of the front and rear walls 195, 200 may be aligned with each other and have substantially identical perimeter shapes at the front and rear walls 195, 200 to define passages through the entire thickness of the breakaway boom segment 100.

Figure 6:
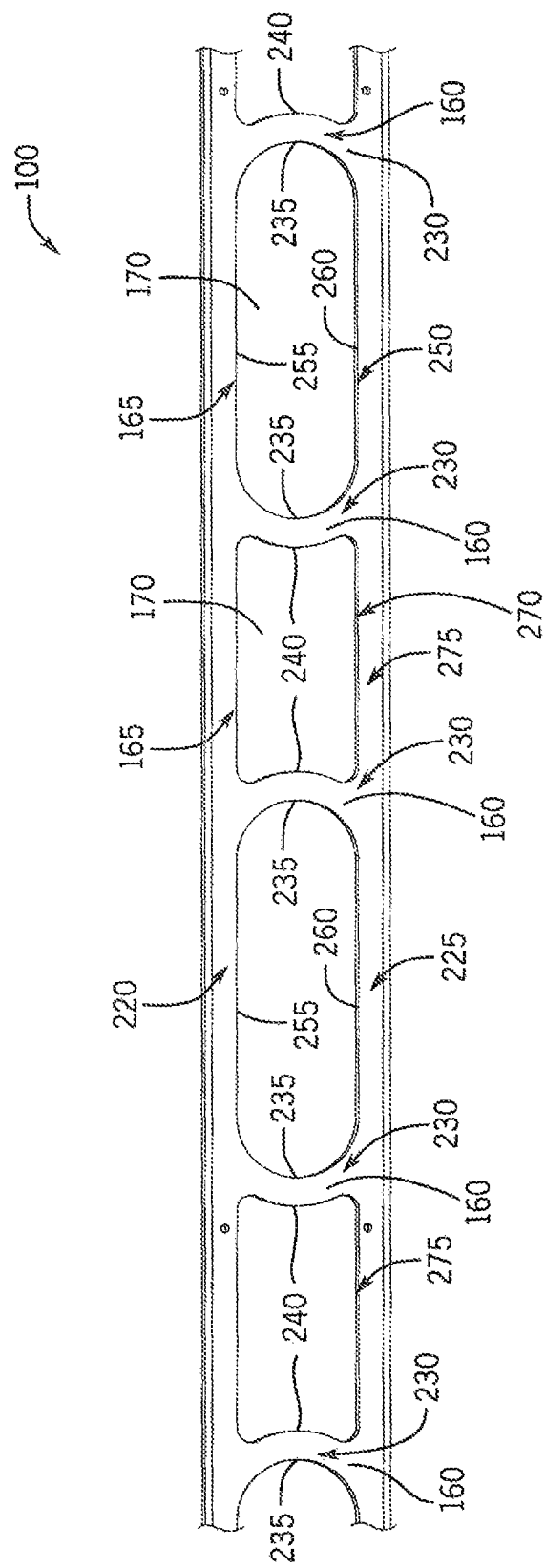
FIG. 6 is a front elevation view of a portion of the prickly boom segment of FIG. 3.

Upper and lower walls 185, 190 face upwardly and downwardly, and front and rear walls 195, 200 face forward and back or toward forward and reverse travel directions of sprayer 15. Upper and lower portions 220, 225 of the front and rear walls 195, 200 are respectively connected to the upper and lower walls 185, 190. Referring now to FIG. 6, webs of material 160 interconnect the upper and lower portions 220, 225, extending as web segments 230 between the openings 170. Each web segment 230 has a curved profile(s) that defines portions of outer boundaries of openings 170 of respective cutouts 165. Each web segment 230 is shown with a concave portion 235 and a convex portion 240 facing in opposite directions.

A first set 250 of cutouts 165 is defined by the cutouts 165 arranged between respective adjacent concave portions 235 facing each other of adjacent pairs of web segments 230. Cutouts 165 of the first set 250 of cutouts define generally oval perimeter shapes, which may define generally or, for the most part, flat top and bottom segments 255, 260. A second set 270 of cutouts 165 is defined by the cutouts 165 arranged between respective adjacent convex portions 240 facing each other of adjacent pairs of web segments 230. Cutouts 165 of the second set 270 of cutouts define generally hourglass perimeter shapes 275. Referring again to FIG. 5, a third set 280 of cutouts 165 defines openings 170 as slots 285 extending through lower wall 190 of box 180. Slots 285 can provide tracks for adjustably and removably mounting sprayer nozzles 70 from the breakaway boom segment 100.

Figure 7:
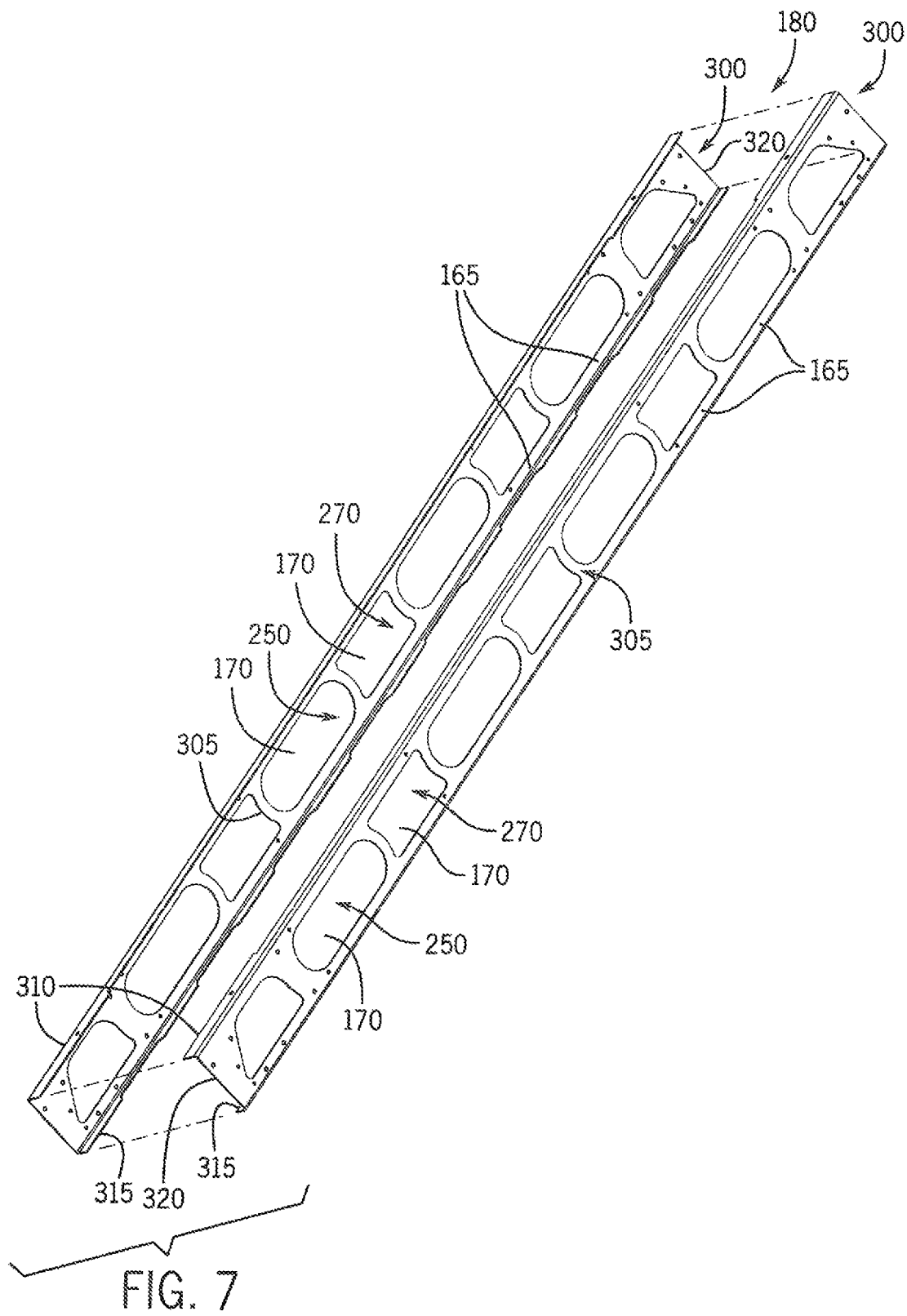
FIG. 7 is an exploded pictorial view of the breakaway boom segment of FIG. 3.

Referring now to FIGS. 5 and 7, box 180 is shown as a fabricated box made from a pair of multi-flanged channel pieces 300 that are connected to each other forming the box configuration of the breakaway boom segment 100. The multi-flanged channel pieces 300 have side walls 305 corresponding to the front and rear walls 195, 200 of box 180 with upper and lower flanges 310, 315 on opposite sides of channel opening 320.

Figure 8:
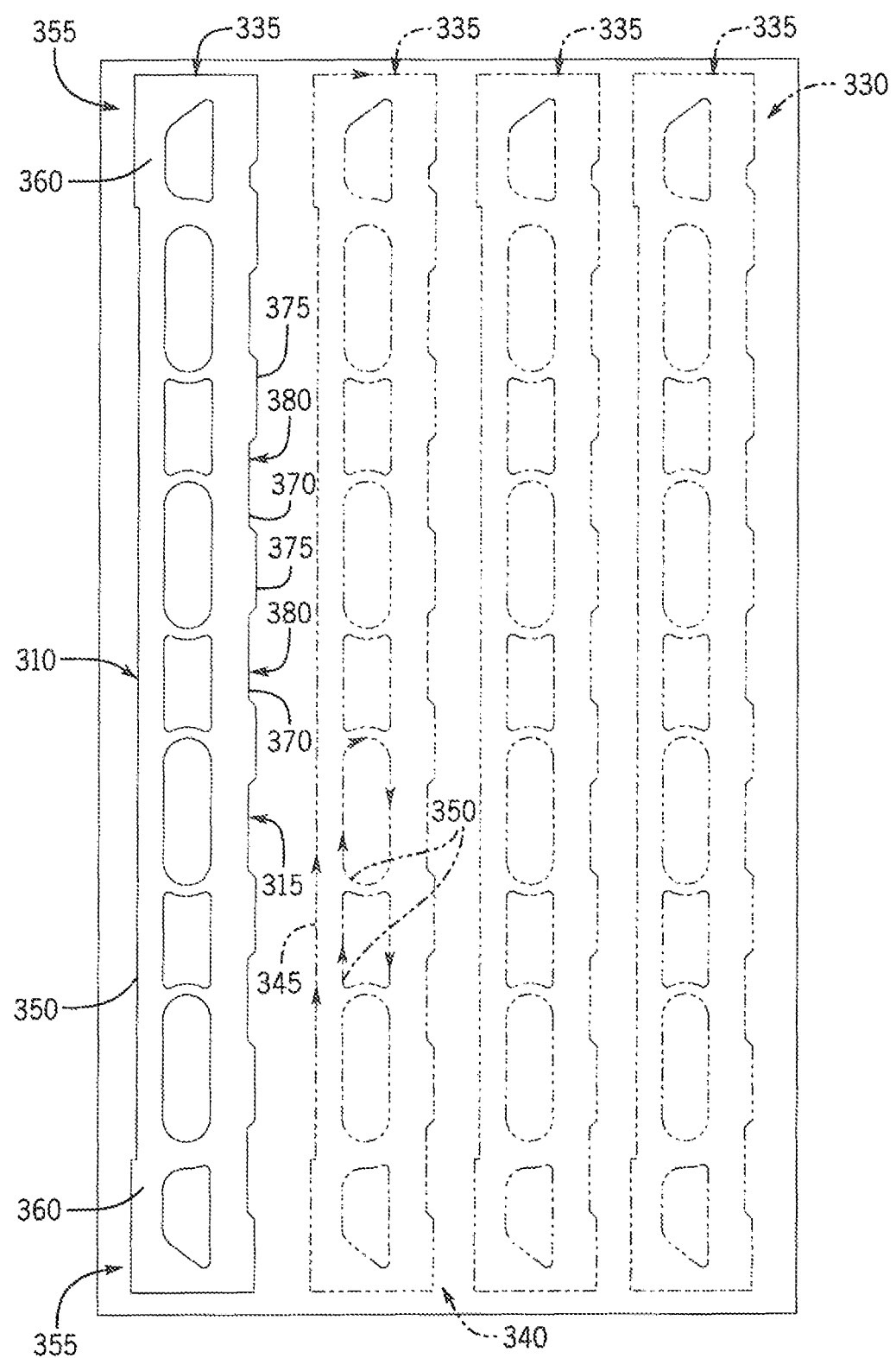
FIG. 8 is a top plan view of a piece of sheet material for making blanks of a breakaway boom segment according to the invention.
Figure 9:
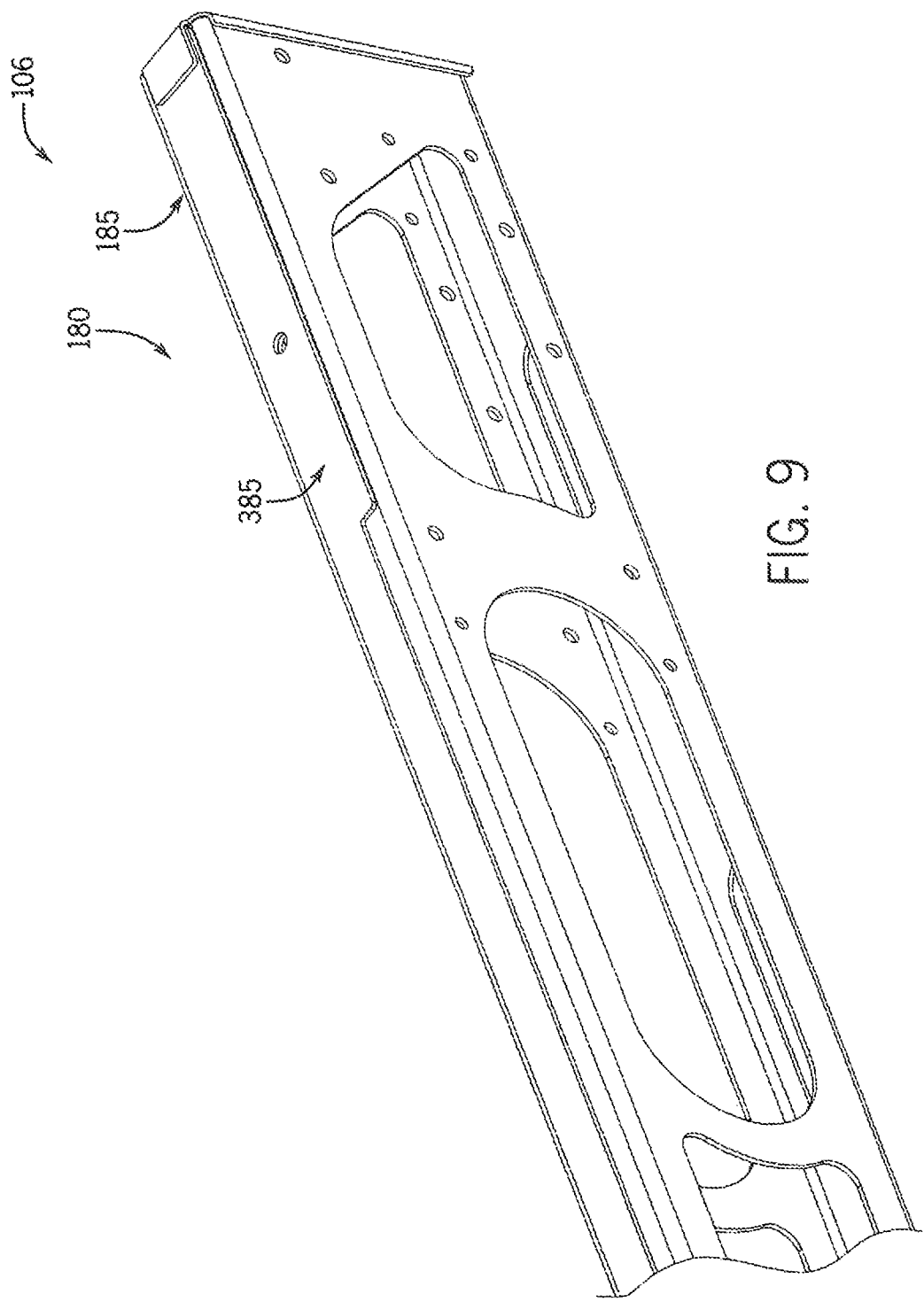
FIG. 9 is a close-up pictorial view of a portion of the breakaway boom segment of FIG. 3.
Figure 10:
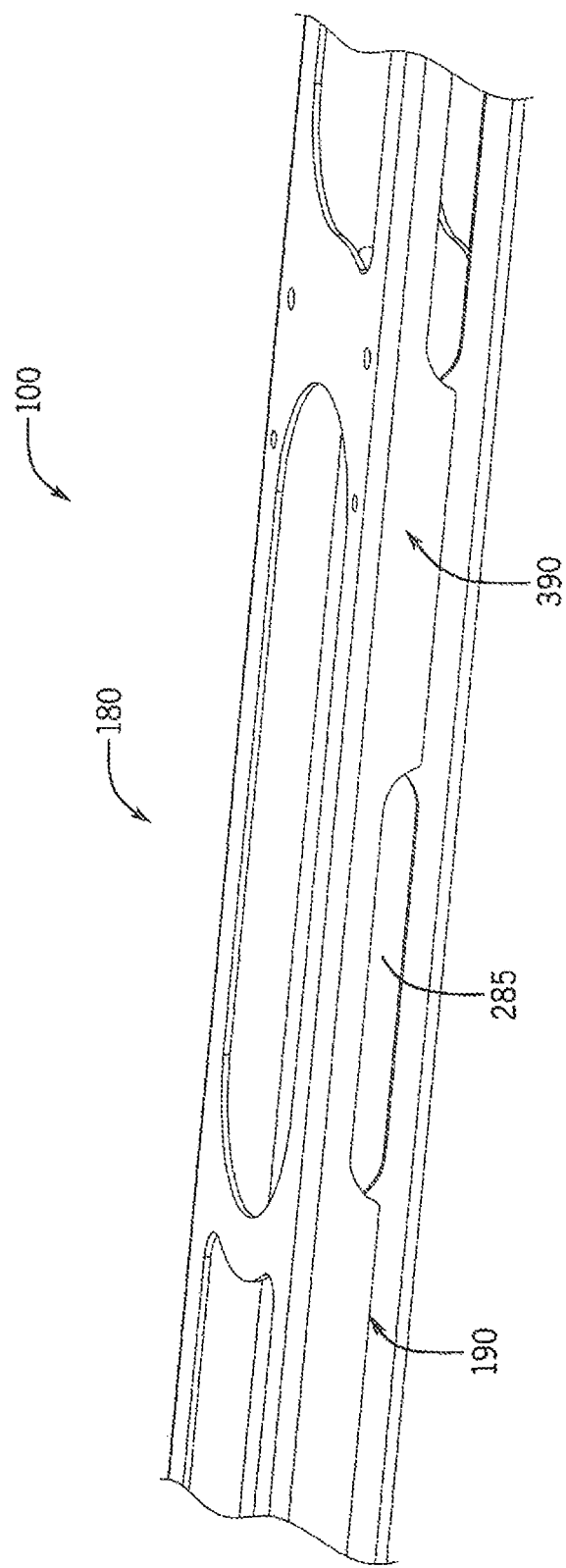
FIG. 10 is a close-up pictorial view of another portion of the breakaway boom segment of FIG. 3.

Referring now to FIG. 8, the multi-flanged channel pieces 300 can be made from a flat piece(s) of sheet material 330 by cutting blanks 335 and forming the blanks 335 into the multi-flanged channel pieces 300. The cutting may be performed at a CNC or other automated cutting station that incorporates, for example, a laser cutter, a plasma cutter, or water jet cutter. The blank 335 may be made by cutting along a path 340 represented in dashed outline including an outer perimeter path 345 providing an outer perimeter shape of the blank 335. Cutting along the outer perimeter path 345 provides segments corresponding to the upper flange 310 and the lower flange 315. Upper flange 310 has an upper main flange edge 350 extending along a straight line path between ends 355 of blank 335 and upper flange end tab segments 360 at the ends 355 of blank 335. End tab segments 360 extend transversely beyond upper main flange edge 350. Lower flange 315 has lower main flange edge segments 370 extending in a segmented manner along a straight line path between ends 355 of blank 335, with the segments of the lower main flange edge segments 370 interrupted by intervening lower flange tab segments 375. The lower main flange edge segments 370 and lower flange tab segments 375 extend in alternating pattern along the length of the lower flange 315, with the lower flange tab segments 375 extending transversely beyond the lower main flange edge segments 370 such that the lower main flange edge segments 370 each defines an elongate recess 380 of the lower flange 315. From blanks 335, upper and lower flanges 310, 315 are bent perpendicularly from the side walls 305 of the multi-flanged channel pieces 300, which may be done on a bending brake or otherwise.

Referring again to FIG. 7, box 180 is formed from the multi-flanged channel piece(s) 300 by at least partially closing the channel opening 320 of the multi-flanged channel piece 300 so that the side wall printer for of the multi-flanged channel piece(s) 300 defines the perforated outer wall 155 (FIG. 3) of the box 180. This may include forming the box 180 from a pair of multi-flanged channel pieces 300 by connecting the first and second multi-flanged channel pieces 300 to each other with the respective channel openings 320 facing each other. The first and second multi-flanged channel pieces 300 may be arranged with respect to each other so that the perforated side walls 305 of the first and second multi-flanged channel pieces 300 define front and rear walls 195, 200 of the box 180. The elongate recesses 380 of lower flanges 315 may be arranged adjacent each other to define the slots 285 (FIG. 5) through the lower wall 190 of box 180. Referring again to FIG. 5, upper and lower flanges 310, 315 of the first and second multi-flanged channel pieces 300 may be nested to provide respective upper wall and a lower wall overlapping segments 385, 390 at upper and lower walls 185, 190 of box 180.

Many changes and modifications could be made to the invention without departing from the spirit thereof. The scope of these changes will become apparent from the appended claims.

We claim:

1. A method of making a breakaway boom segment for use with a sprayer boom of an agricultural sprayer, the method comprising:

forming a first blank from a flat piece of sheet material by cutting along a path including an outer perimeter path providing an outer perimeter shape of the first blank and cutting along multiple cutout paths providing a cutout perimeter shape corresponding to openings extending through the first blank;

forming a generally U-shaped, multi-flanged first channel piece by bending outer side portions of the first blank in a common direction relative to an intermediate portion of the first blank in which the openings of the first blank are arranged such that the multi-flanged first channel piece is defined by a perforated side wall formed from the intermediate portion of the first blank and a pair of flanges formed of the bent outer side portions of the first blank with the pair of flanges spaced from each other and extending perpendicularly from the perforated side wall in a common direction with a channel opening defined between the pair of flanges;

forming a second blank from the flat piece of sheet material by cutting along a path including an outer perimeter path providing an outer perimeter shape of the second blank and cutting along multiple cutout paths providing a cutout perimeter shape corresponding to openings extending through the second blank;

forming a generally U-shaped, multi-flanged second channel piece by bending outer side portions of the second blank in a common direction relative to an intermediate portion of the second blank in which the openings of the second blank are arranged such that the multi-flanged second channel piece is defined by a perforated side wall formed from the intermediate portion of the second blank and a pair of flanges formed of the bent outer side portions of the second blank with the pair of flanges of the multi-flanged second channel piece spaced from each other and extending perpendicularly from the perforated side wall of the multi-flanged second channel piece in a common direction with a channel opening of the multi-flanged second channel piece defined between the pair of flanges of the multi-flanged second channel piece;

forming a box from the multi-flanged first and second channel pieces by connecting the multi-flanged first and second channel pieces to each other with the respective channel openings facing each other such that upper and lower flanges of the multi-flanged first and second channel pieces provide overlapping wall segments at upper and lower walls of the box;

wherein the upper flange of one of the multi-flanged first and second channel pieces includes a recess formed therein between and spaced from first and second ends of the one of the multi-flanged first and second channel pieces.

2. The method of claim 1 wherein openings extending through the side wall of the multi-flanged second channel piece defines a perforated side wall of the multi-flanged second channel piece and the method further comprises arranging multi-flanged first and second channel pieces with respect to each other so that the perforated side walls of the multi-flanged first and second channel pieces define front and rear walls of the box with the openings permitting access into an interior space of the box.

3. The method of claim 1 wherein lower flanges of each of the multi-flanged first and second channel pieces includes an elongate recess and the method further includes arranging the elongate recesses of the lower flanges of the multi-flanged first and second channel pieces adjacent each other to define slots through a lower wall of the box.

* * * * *